(12) United States Patent
Sano et al.

(10) Patent No.: US 6,641,771 B1
(45) Date of Patent: Nov. 4, 2003

(54) METHOD FOR MANUFACTURING GOLF BALL

(75) Inventors: Hideki Sano, Kobe (JP); Hiroaki Tanaka, Kobe (JP); Masaaki Kikuchi, Akashi (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 09/477,626

(22) Filed: Jan. 4, 2000

(30) Foreign Application Priority Data

| Jan. 18, 1999 | (JP) | ................................ 11-008932 |
| Apr. 9, 1999 | (JP) | ................................ 11-102654 |
| Jun. 24, 1999 | (JP) | ................................ 11-177739 |

(51) Int. Cl.[7] .............................................. B29C 45/14
(52) U.S. Cl. ...................... 264/278; 264/279.1; 264/347
(58) Field of Search ............................... 264/278, 279.1, 264/236, 347, DIG. 59, 248

(56) References Cited

U.S. PATENT DOCUMENTS

| 2,376,085 A | * | 5/1945 | Radford et al. ................ 18/30 |
| 3,278,992 A | * | 10/1966 | Strauss ........................... 18/30 |
| 4,410,387 A | * | 10/1983 | Halkerston et al. ......... 156/245 |
| 4,625,964 A | * | 12/1986 | Yamada ........................ 273/62 |
| 5,882,567 A | * | 3/1999 | Cavallaro et al. ........... 264/255 |
| 6,036,907 A | * | 3/2000 | Tanaka et al. .............. 264/250 |
| 6,207,095 B1 | * | 3/2001 | Gosetti ........................ 264/250 |
| 6,342,019 B1 | * | 1/2002 | Boehm et al. .............. 473/378 |

* cited by examiner

Primary Examiner—Edmund H. Lee
(74) Attorney, Agent, or Firm—Birch, Stewart, Kolasch & Birch, LLP

(57) ABSTRACT

A method for manufacturing a golf ball in which the eccentricity of an inner core of the golf ball is greatly reduced. The method includes the steps of providing a mold which defines a mold cavity, positioning a vulcanized inner core in the mold cavity so as to define a shell space between the inner core and an inner surface of the mold cavity, introducing an unvulcanized rubber material into the shell space so that a layer of unvulcanized rubber covers the inner core, forming an intermediate product, removing the intermediate product from the mold, placing the intermediate product into a vulcanization mold cavity containing a dimple-forming interior surface and vulcanizing the layer of unvulcanized rubber and forming dimples in the rubber material during vulcanization.

10 Claims, 10 Drawing Sheets

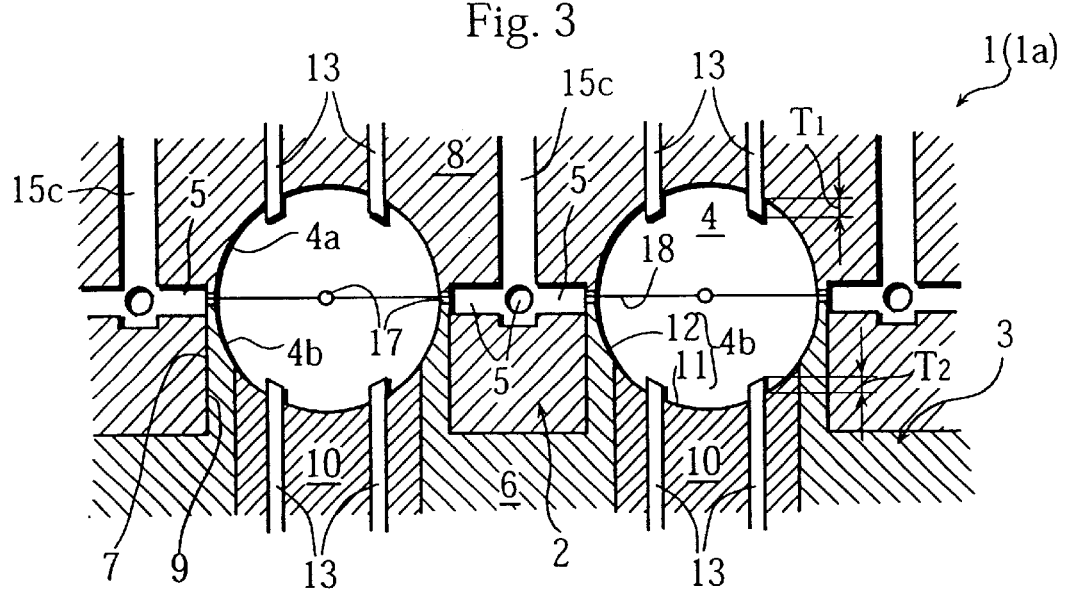
Fig. 3
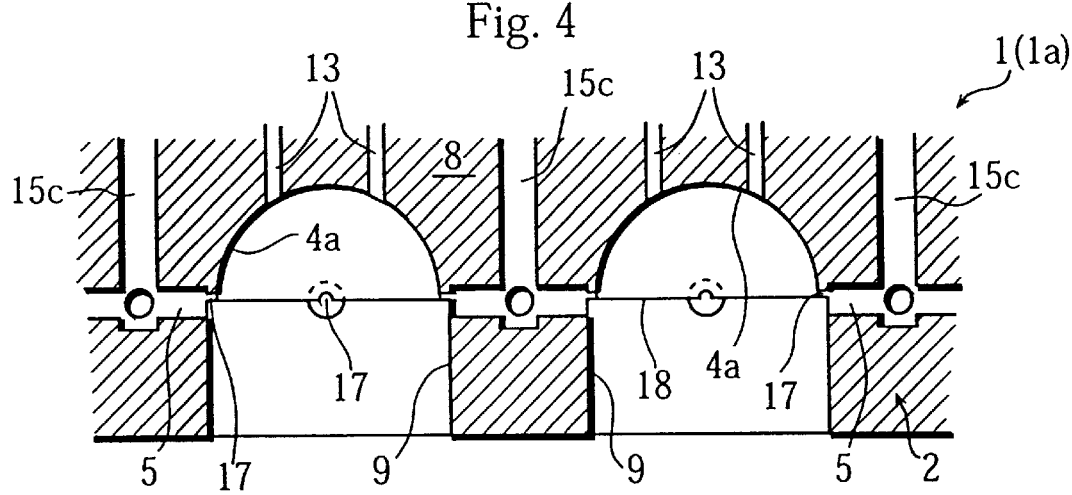
Fig. 4
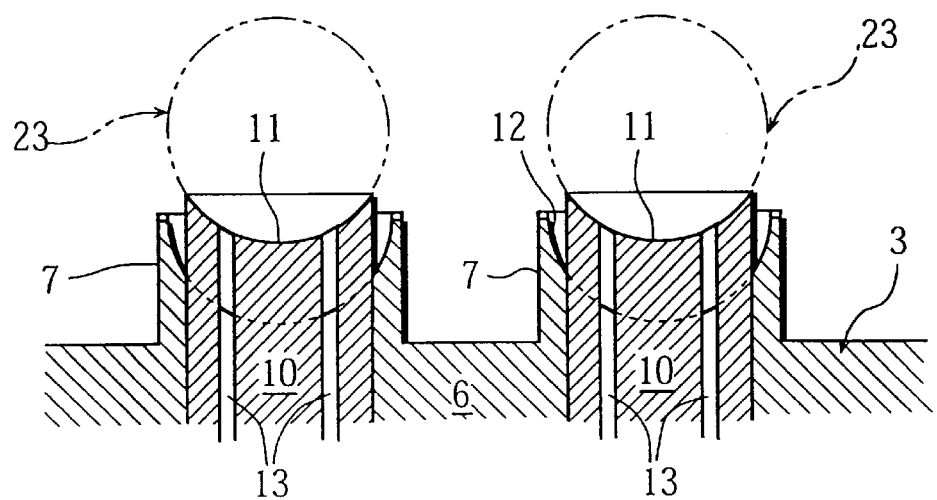

PRIOR ART
Fig. 11A
Fig. 11B
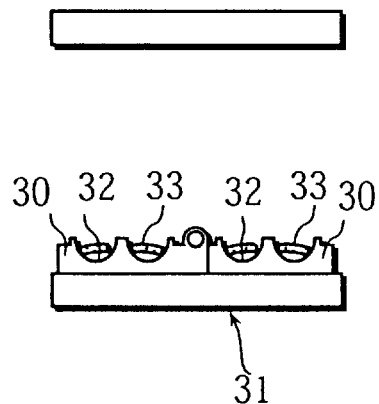
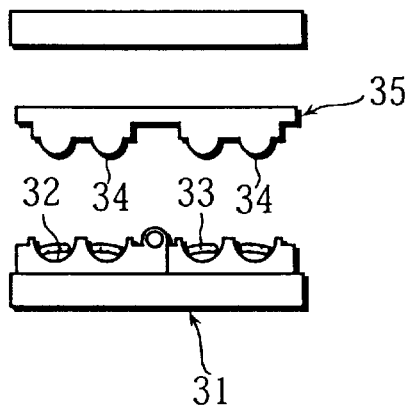
Fig. 11C
Fig. 11D
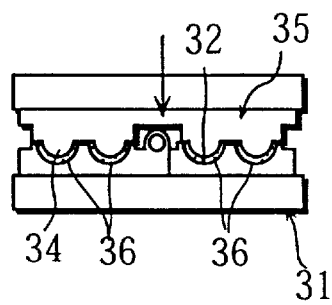
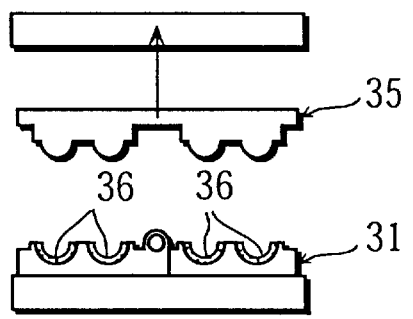
Fig. 11E
Fig. 11F
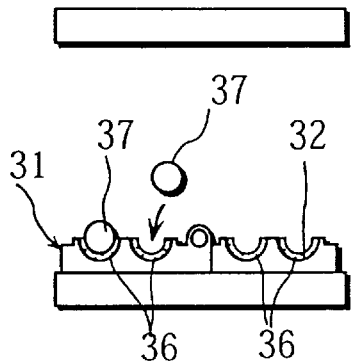
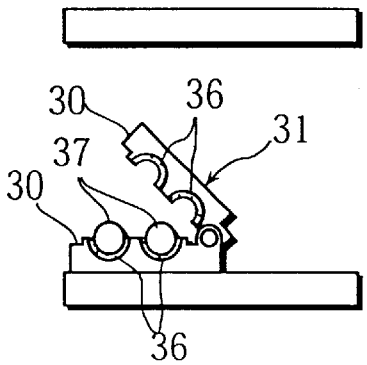

METHOD FOR MANUFACTURING GOLF BALL

BACKGROUND OF THE INVENTION

1. Field of the Invention

The present invention relates to a method and a mold for manufacturing a golf ball.

2. Description of the Related Art

A conventional method for manufacturing a core of a multiple piece golf ball, such as a two-layer core, or a three-layer core, is described below.

In FIG. 11A, a mold for preliminary forming rubber shells having a lower mold 31 and an upper mold 35 is shown. The lower mold 31 has a pair of mold halves 30 connected by a hinge. Each of the mold halves 30 is provided with hemispherical concave portions 32. The upper mold 35 is provided with hemispherical convex portions 34 corresponding to the concave portions 32. As shown in FIGS. 11B, 11C and 11D, an unvulcanized rubber material 33 is placed into each of the concave portions 32, and the upper mold 35 is lowered to press the rubber materials 33 against the lower mold 31. Thus hemispherical unvulcanized rubber shells 36 are formed.

After that, as shown FIG. 11E, a vulcanized inner core 37 is placed into each of the unvulcanized rubber shells 36 formed on each of the concave portions 32 of either one of the mold halves 30. Then as shown in FIG. 11F and FIG. 12A, the other mold half 30 is folded so as to be placed on the mold half 30 containing the inner cores 37, after which the mold is closed, and pressed. Thus the inner cores 37 are covered with the unvulcanized rubber shells 36 formed on the other mold half 30, as shown in FIG. 12B. That is to say, each of the inner cores 37 is covered with each pair of the unvulcanized rubber shells 36 to form spherical intermediate products 38. Then, as shown in FIG. 12C, ejectors 39 provided on one side of the mold halves 30 are moved to eject the products 38. The products 38 are then set in a mold for vulcanization molding 40 as shown in FIG. 12D, and the unvulcanized shells 36 of the products 38 are vulcanized to form cores, not shown.

In the conventional method described above, there is a problem in the process of covering the inner cores 37 with the shells 36 such that the inner cores 37 are moved by the process pressure and become greatly eccentric.

There is also a quality problem of the cores wherein a connected face, or the joint of each pair of the shells 36 which cover the inner core 37 sometimes becomes separated. To prevent the separation of the connected faces, the temperature of the mold in the process of covering, the temperature of the rubber materials, the pressure applied to the mold in the pressing process, and the pressing time of the pressing process are optimized. However, the separation of the connected faces can not be prevented completely. Moreover, it is not possible to produce a large number of cores at one time using the conventional method.

It is therefore an object of the present invention to provide a method for manufacturing a golf ball which greatly reduces the eccentricity of an inner core of a golf ball whereby a golf ball of high quality can be effectively manufactured. It is another object of the present invention to provide a mold and a method for manufacturing a golf ball wherein a large number of cores are manufactured at one time.

BRIEF DESCRIPTION OF THE DRAWINGS

The present invention will be described with reference to the accompanying drawings, in which:

FIG. 3 is a sectional view showing a principal portion of a mold for injection molding in a closed state;

FIG. 4 is a sectional view showing a principal portion of a mold for injection molding in an opened state;

FIG. 11A is an explanation of the prior art manufacturing method;

FIG. 11B is a view for explanation of the prior art manufacturing method;

FIG. 11C is an explanation of the prior art manufacturing method;

FIG. 11D is an explanation of the prior art manufacturing method;

FIG. 11E is an explanation of the prior art manufacturing method;

FIG. 11F is an explanation of the prior art manufacturing method;

DESCRIPTION OF THE PREFERRED EMBODIMENTS

Preferred embodiments of the present invention will now be described with reference to the accompanying drawings.

Figure 1:
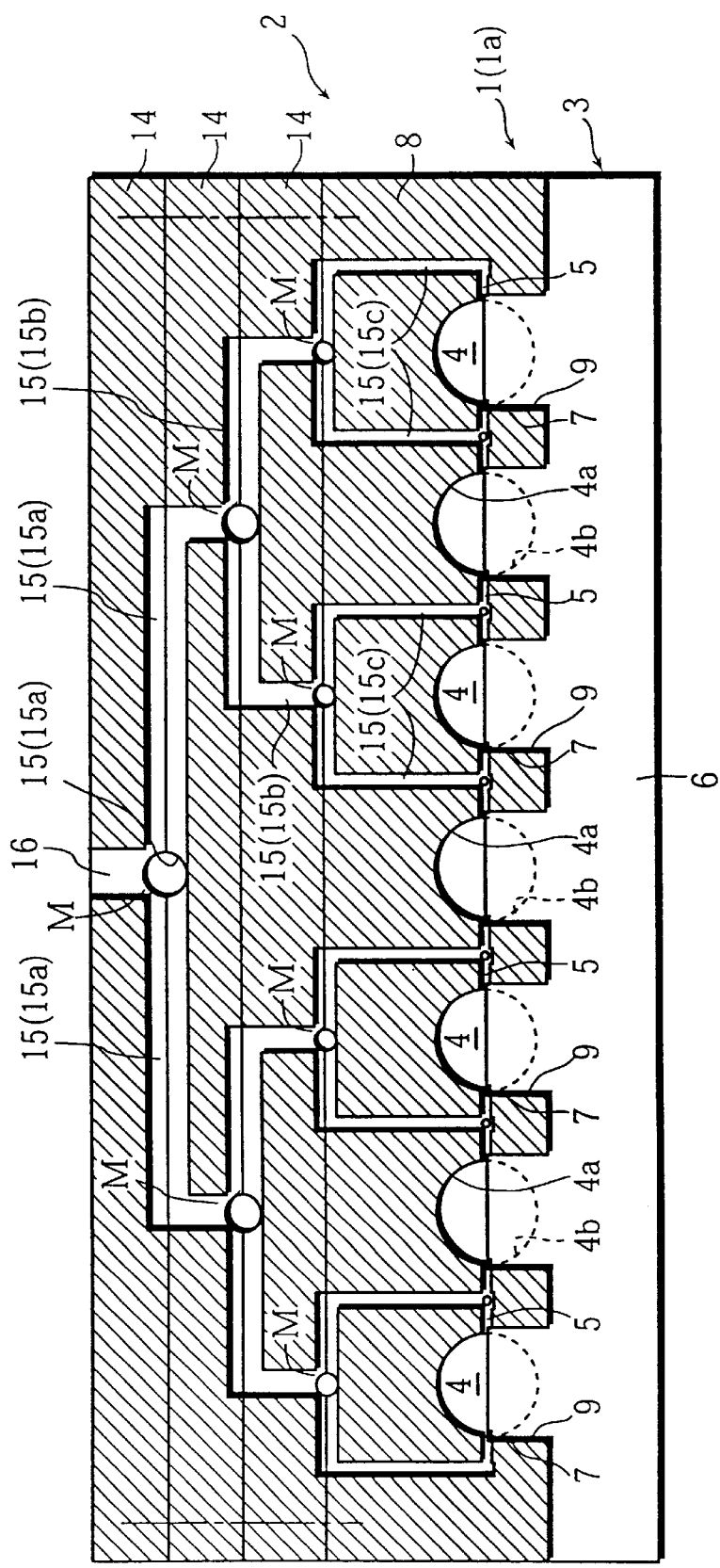
FIG. 1 is a sectional view showing an embodiment of a mold for the injection molding of a golf ball for use in a method for manufacturing a golf ball according to the present invention.

FIG. 1 shows an embodiment of a mold for molding a golf ball which is for use in the method for manufacturing a golf ball according to the present invention. The mold 1(1a) is for injection molding and is provided with an upper mold side 2 and a lower mold 3. The upper mold side 2 has an upper mold main body 8 and a plurality of plate members 14 which are connected together and layered on the upper face of the main body 8. Inside the upper mold side 2, runner portions 5 communicated with gate portions of cavities 4, and passages 15 for conveying rubber material communicated with the runner portions 5.

Specifically as shown in FIGS. 1 to 4, the mold 1(1a) for injection molding has a plurality of cavities 4. In this embodiment, forty nine cavities are shown. On the underside of the upper mold side 2, hemispherical concave portions 4a are provided to form the upper half portions of the cavities 4. On the upper side of the lower mold 3, hemispherical concave portions 4b are provided to form the lower half portions of the cavities 4.

The lower mold 3 is provided with a rectangular lower mold main body 6, and a plurality of protruding portions 7 are formed on the upper side of the main body 6. The hemispherical concave portions 4b are formed on the upper face of the protruding portions 7. The upper mold side 2 is provided with the rectangular main body 8, and a plurality of recessed portions 9 are formed on the under face of the main body 8. The positions of the recessed portions 9 correspond to the positions of the protruding portions 7. Each of the concave portions 4a is provided in the back portion of each recessed portion 9.

Ejectors are provided on the lower mold side 3. Portions 10 for moving back and forth of the ejectors are provided in positions corresponding to the protruding portions 7 of the lower mold 3. That is to say, through holes are provided, which extend from the protruding portions 7 to the main body 6, and the portions 10 are inserted in the through holes as to be freely, vertically movable back and forth. When each of the portions 10 is at its back position, an upper end portion 11 of each portion 10 and an upper end portion 12 of each protruding portion 7 form continuous surface which is concavely curved.

A plurality of holding pins 13 for protruding into the cavities 4 are provided in the upper mold side 2 and the lower mold 3 to be freely movable, back and forth. Vertical hole portions for the insertion of the pins 13 of the upper mold side 2 are positioned at the concave portions 4a on the upper mold main body 8 of the upper mold side 2. Vertical hole portions for insertion of and for holding the pins 13 of the lower mold side 3 are provided in each portion 10 of each ejector. The vertical hole portions hold the inserted holding pins 13 so that the pins 13 can freely move back and forth. In an upper view and a bottom view of pins 13 of each cavity 4, the pins 13 are positioned so that the central angle which each pin 13 is forming with each adjacent pin 13 is arranged to be equal with one another. The positions of the pins 13 of the upper mold side 2 and the positions of the pins 13 of the lower mold 3 correspond with each other. The number of the pins 13 on each concave portion on each mold side are, for example, three or four. The holding pins 13 of the upper mold side 2 and the lower mold side 3 are driven to move back and forth by a driving mechanism, not shown.

Figure 6:
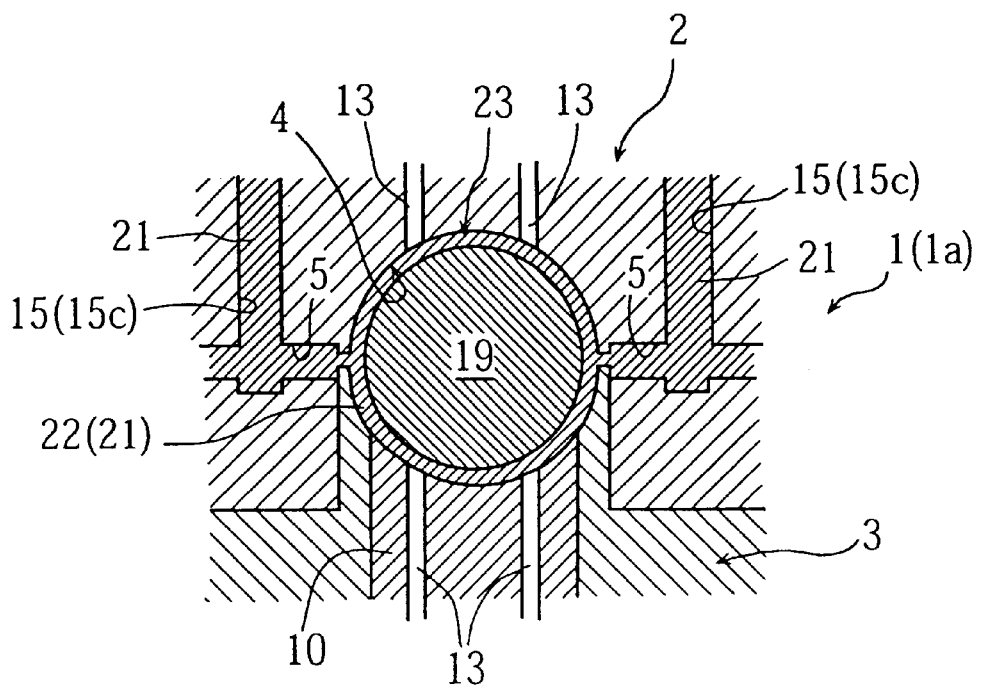
FIG. 6 is a sectional view showing the injection molding state.

Because the end faces of the holding pins 13 are concavely curved, when the holding pins 13 are in their back position, the end faces of the holding pins 13 and the inner face of the cavity 4 form a continuous surface which is concavely curved. To be specific, as shown in FIG. 6, the end faces of the holding pins 13 and the inner faces of each concave portion 4a and concave portion 4b form a continuous surface.

The holding pins 13 on the upper mold side 2 protrude into each cavity 4 by a length $T_1$-, and the holding pins 13 on the lower mold side 3 also protrude into each cavity 4 by a protruding length $T_2$-. The difference between the length $T_1$ and the length $T_2$ are arranged to be 0.03 mm to 0.2 mm. To be specific, the length $T_1$ of the pins 13 on the upper mold side 2 is arranged to be 1.8 mm, and the length $T_2$ of the pins 13 on the lower mold side 3 is arranged to be 1.7 mm, therefore, the length $T_1$ is arranged to be slightly longer than the length $T_2$.

Figure 2:
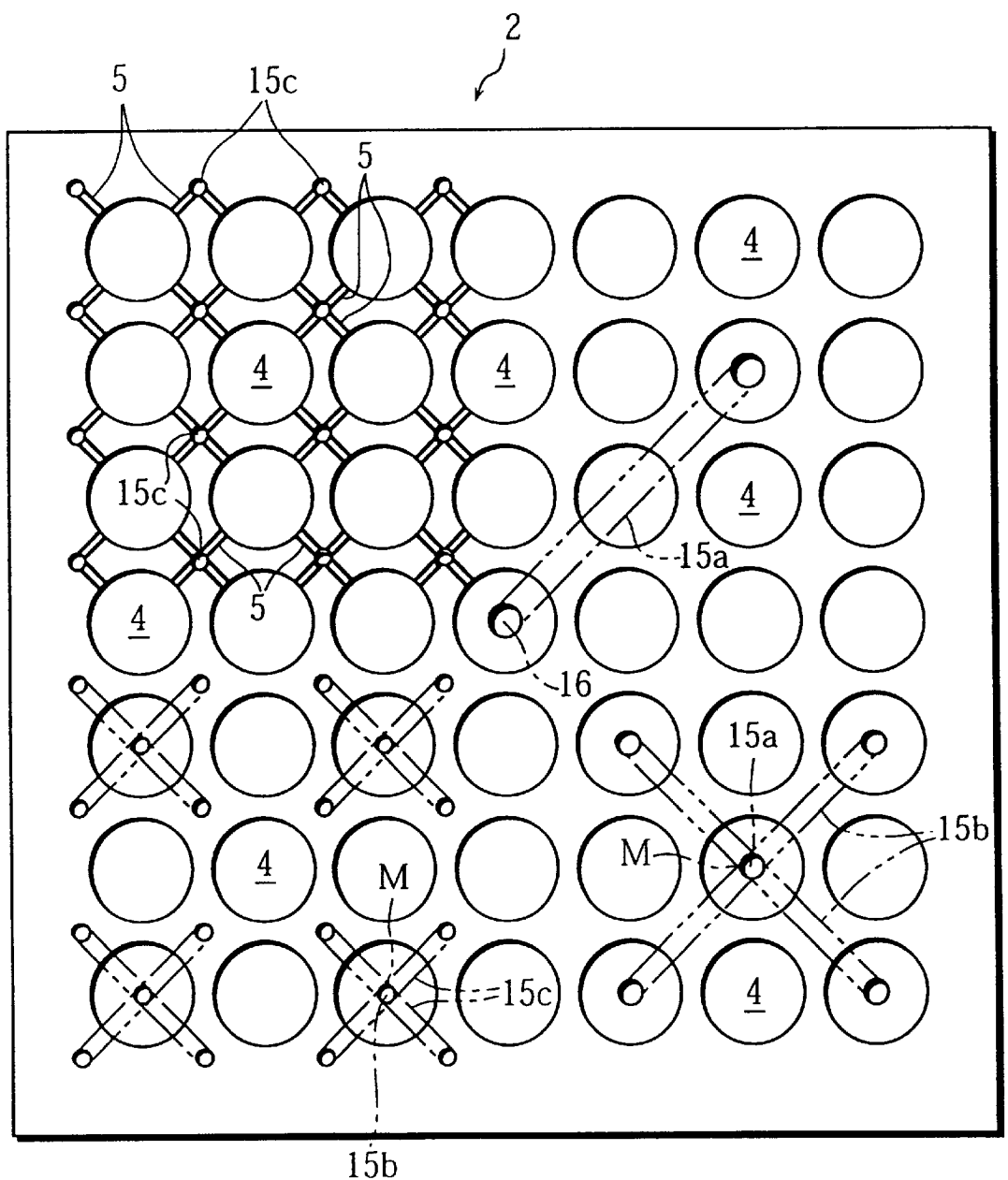
FIG. 2 is an explanatory view showing molds with the positions of passages relative to mold cavities, and the positions of runner portions relative to the mold cavities.

Referring to FIG. 1 and FIG. 2, as described above, the upper mold side 2 is provided with the main body 8 and three plate members 14 which are connected together and layered on the upper face of the main body 8. At the center area of the upper most plate member 14, a rubber material inlet 16 is vertically provided. The inlet 16 is provided at a position corresponding to the center cavity 4 among all the cavities 4.

The inlet 16 branches from a branch portion M to form four passages 15a. The contacting face of the upper most plate member 14 and the middle plate member 14 is the center of each passage 15a. In a top view of the passages 15a, each passage 15a forms a right angle with each adjacent passage 15a, and the passages 15a cross each other in the form of an X above the cavities 4. Each passage 15a is bend down to reach each branch point M on a contacting face of the middle plate 14 and the lower most plate 14. Then each passage 15a branches from each branch portion M to form four passages 15b which cross to each other in the form of the letter X, in a plan view. The passages 15b extend down to reach branch portions M on the contacting face of the lower most plate 14 and the upper mold side 2.

Each passage 15b branches from each branch portion M to form four passages 15c which cross each other in the form of an X in a plan view. The passages 15c are extend to contact runner portions 5 of the upper mold side 2.

As shown in FIGS. 1 to 4, the runner portions 5 are located at the level of the dividing faces of the cavities 4, and are arranged to communicate with each of the cavities from four directions in a grid-like manner. Crossing portions and ends of the runner portions 5 communicate with lower end portions of the passages 15c.

Next, referring to FIGS. 3 to 4, a step portion 18 is provided between each recessed portion 9 of the upper mold 2 and each concave portion 4a provided at the back portion of each recessed portion 9. When the mold is closed, the upper end face of each protruding portion 7 of the lower mold 3 contacts each step portion 18. Gate portions 17 of each cavity 4 are formed by grooves, and each groove is a semicircle in cross section, formed on the upper face of each protruding portion 7 of the lower mold 3. Other grooves forming a semicircle in cross section are formed on each step portion 18. End portions of the runner portions 5 communicated with the gate portions 17 which are partly open toward each recessed portion 9. When the mold 1 is closed, the end portions of the runner portions 5 are closed by each protruding portion 7 of the lower mold 3, and only the gate portions 17 are opens to each cavity 4.

The method for manufacturing a golf ball using the mold 1(1a) for injection molding is described below. Specifically, it is a method for manufacturing a multiple piece golf ball. The multiple piece golf ball here means a golf ball having at least two pieces.

Figure 5:
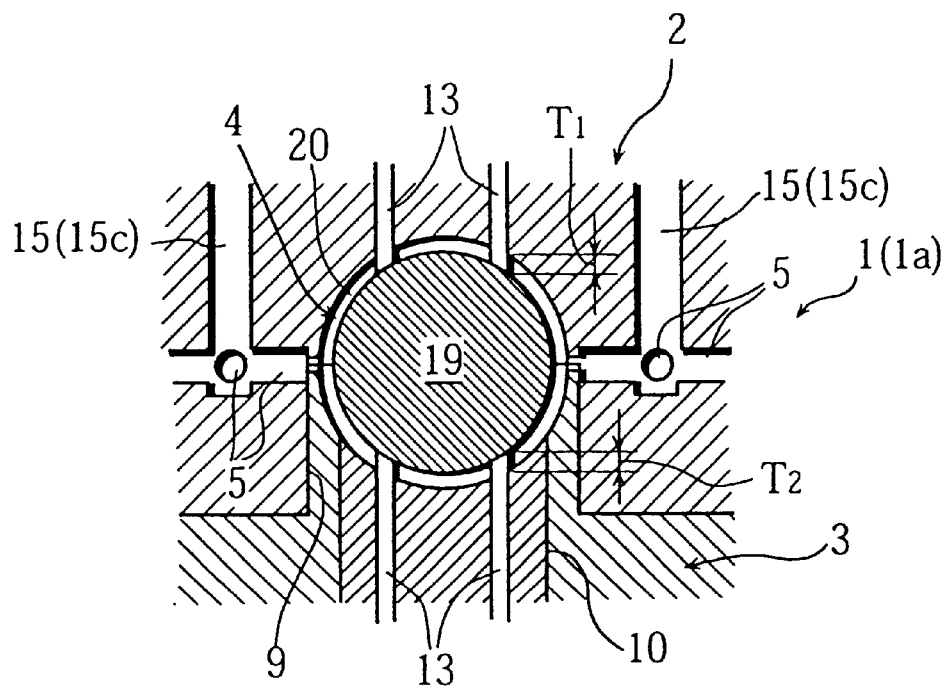
FIG. 5 is a sectional view showing the state that an inner core held in a cavity.

First, a method for manufacturing a golf ball core (two-piece core) is described. As shown in FIG. 5, in the mold 1 for injection molding, a vulcanized inner core 19 is held in each cavity 4 so that a spherical shell-like space 20 is formed between each core 19 and an inner face of each cavity 4 i.e. the inner faces of each of the hemispherical concave portions 4a and 4b. That is to say, the holding pins 13 on the upper mold side 2 are extend into each cavity 4 by a length of $T_1$, and the holding pins 13 on the lower mold side 3 extend into each cavity 4 by the length of $T_2$. Thus, the holding pins 13 on both sides of the core fix the inner cores 19 in position. The surfaces of the inner cores 19 are preferred to be preliminarily polished by a buffing compound.

After that, as shown in FIGS. 1 and 6, unvulcanized rubber material 21 is injected into each spherical shell space 20 of each cavity 4.

That is to say, the material 21 is injected from the inlet 16 formed on the plate member 14 of the upper mold side 2, and passes through the passages 15 and the runner portions 5 to fill each of the spaces 20 of each of the cavities 4. Thus layers 22 of the unvulcanized rubber, each of which is layered on each inner core 19, form spherical intermediate products 23. The injection of the rubber materials 21 is operated under such conditions of temperature or pressure that the material 21 does not solidify. The holding pins 13 are moved back when the rubber materials 21 fill up the spherical shell spaces 20.

Because the surface of each inner core 19 is polished by a buff compound, good adhesion of each unvulcanized rubber layer 22 and each inner core 19 can be obtained. Furthermore, the product 23 is greatly prevented from becoming out of shape and eccentric, which is caused by the shrinking force of the unvulcanized rubber layers, compared to a product 23 formed with an inner core in which the face is not buffed.

As shown in FIG. 4, when the mold 1(1a) is opened, each intermediate product 23 is removed from each portion 4a of the upper mold side 2 and remains on each portion 4b on the lower mold 3. To be specific, the unvulcanized rubber material introduced into each space 20 is pressured, causing a force to inflate the material. The greater the rubber volume becomes, the greater the force (resilience) becomes. As described above with reference to FIGS. 3 and 5, the holding pins 13 on the upper mold side 2 is arranged to be longer than the pins 13 on the lower mold side 3 by a determined length, specifically 0.03 mm to 0.2 mm, and the volume or the thickness of each unvulcanized rubber layer 22 on the upper mold side 2 is formed greater the volume of each layer 22 on the lower mold aside 3. Therefore the resilience of each layer 22 on the upper mold 2 is greater than that of each layer 22 on the lower mold 3, and each intermediate product 23 is detached from the upper mold and remains on the lower mold.

If a difference between the protruding length $T_1$ and the length $T_2$ is below 0.03 mm, some products 23 may be adhere to the upper mold side 2 when the mold 1a is opened, and thus removing the products t can be time consuming. Contrary to this, if the difference is more than 0.2 mm, the difference of the thickness between the layers 22 on the upper side 2 and the layers on the lower side 3 becomes too large causing eccentricity of each of the inner cores 19.

Next, when the mold 1a is opened, each ejector is driven to raise each portion 10 of each portion 7 of the lower mold 3 to eject the products 23. Thus each product 23 is removed from the mold 1. Then the products 23 are put into a mold for vulcanization, not shown, and the rubber layers 22 of the products 23 are vulcanized to form cores, each of which is a two-layer core having a vulcanized inner core 19 and the vulcanized rubber layer.

The unvulcanized rubber material 21 remaining in the runner portions 5 and the passages 15 does not become stiffen, and the material 21 can be used in subsequent injection molding processes. The thickness (or an inner diameter) or the number of the runner portions 5 or the gate portions 17 to be provided may be changed freely to increase the adhesiveness between each layer 22 and each inner core 19.

To manufacture golf balls, each having a three-layer core, first the two-layer cores each of which having a vulcanized inner core layered with a vulcanized rubber layer is formed, and then each core is injection molded to be layered with an unvulcanized rubber layer. After that, the molded cores are vulcanized to form three-layer cores.

According to the present invention, two-piece golf balls can also be manufactured. To be specific, vulcanized inner cores are covered with unvulcanized outer layers by injection molding to form intermediate products. Then the intermediate products are put into a mold for vulcanization, wherein the mold cavity is provided with convex portions for forming dimples. Dimples are formed in the layers while vulcanizing.

In the mold 1(1a) for injection molding as described above with reference to FIGS. 1 to 6, the portions 10 which move back and forth may be omitted. The mold may be designed such that the holding pins 13 on the lower mold 3 push up the intermediate products 23, the pins 13 being provided to freely move back and forth. That is to say, each of the holding pins is arranged to protrude longer so that the products 23 can be easily ejected by the pins. In other words, when ejecting the products, pins are arranged to protrude longer the pins holding each inner core 19, so that the products 23 can be easily removed by the pins.

Figure 7:
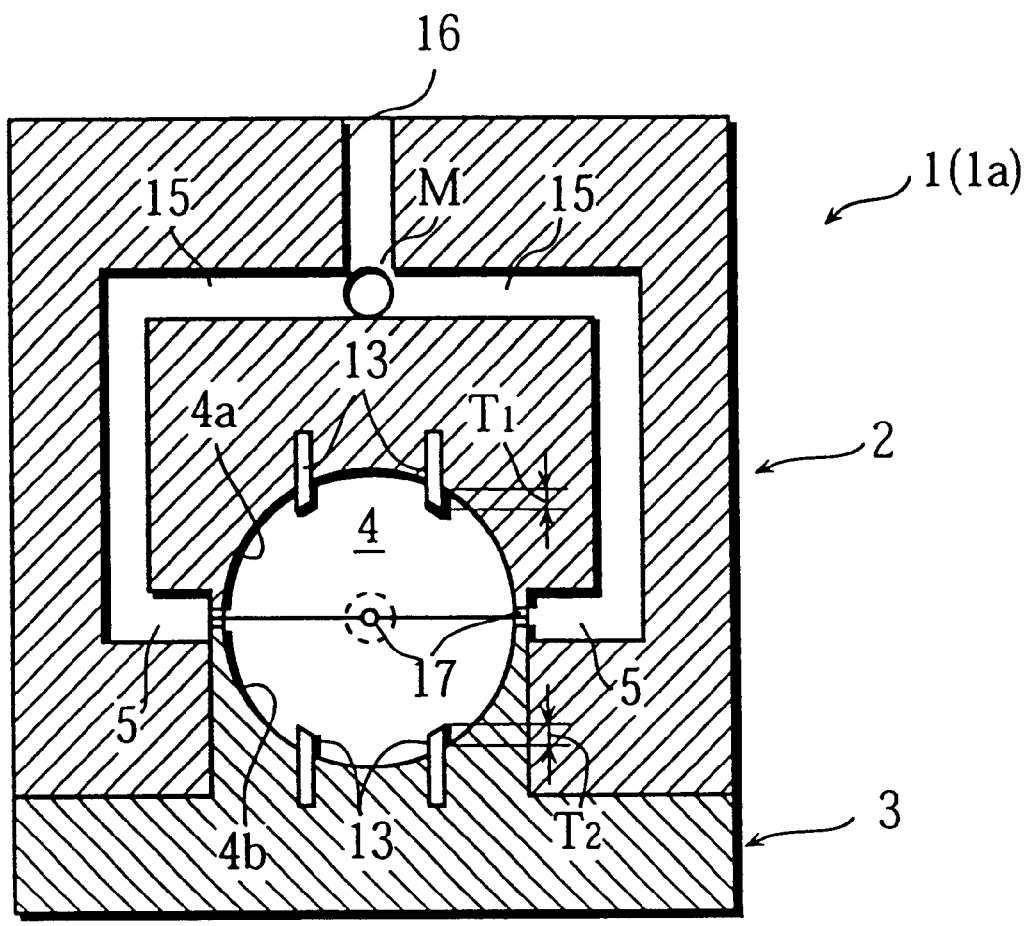
FIG. 7 is a sectional view showing another embodiment of the mold for injection molding a golf ball.

FIG. 7 shows another mold 1(1a) for injection molding. In this mold 1a, holding pins 13 are protruding into cavities and fixed to an upper mold side 2 and a lower mold 3. In this case, after injection molding, unvulcanized rubber layers of intermediate products removed from the mold 1a are pitted by the pins 13. However the pits soon start to become shallower due to the shrinkage of the unvulcanized layers, and the pits are completely covered by flow of rubber. The amount of unvulcanized rubber material to be injected and filled is sufficient so that the holes can be completely covered.

The mold 1a for transfer molding is not restricted to the embodiments as shown above. For example, the holding pins 13 on the lower mold side 3 may be arranged to be longer the pins 13 on the upper mold side 2 so that the intermediate products are attached to the upper mold side 2 when the mold 1 is opened. In this case, the pins 13 of the upper mold side 2 to push down the products, and the products are then removed. The products to be taken off may be received by a receiving plate positioned between the upper mold 2 and the lower mold 3.

In the embodiment of the present invention described above, the runner portions 5 and the passages 15 are provided on the upper mold side 2. However the runner portions 5 and the passages 15 may be provided on the lower mold side 3. In other words, the configuration of the upper mold 2 and the lower mold 3 may be inverted.

Next, cores of golf balls as intermediate products are manufactured based on the conditions described below. At the same time, as comparison examples, golf ball cores are manufactured according to the conventional method explained above with reference to. FIGS. 11 and 12.

Conditions of the Manufacturing Example

① A compound of an inner core and a compound of a rubber material for forming outer layer are each arranged to have the ratio of each substance in weight as shown below.

BR01    100  (Polybutadiene, of which 97% is

-continued

|  |  | cis, made by Japan Synthetic Rubber Co. Ltd.) |
| --- | --- | --- |
| acrylic zinc | 25 |  |
| zinc oxide | 20 |  |
| dicumylperoxide | 1 |  |

② The substances shown in ① are mixed, and vulcanizing pressed at 152° C. for 20 minutes to form inner cores having an outer diameter of 34 mm.

③ The rubber material for forming the outer layer is produced by mixing the substances shown in ①.

④ As a mold for injection molding, the mold shown in FIG. 7 is used. The protruding length $T_1$ of the hold pins 13 on the upper mold side 2 is arranged to be 1.8 mm, and the protruding length $T_2$ of the holding pins on the lower mold side 3 is arranged to be 1.7 mm. The inner diameter of each cavity 4 is arranged to be 37 mm.

⑤ The rubber material for forming the outer layer is placed into an injection molding machine (65° C., 50 r.p.m.). The material is put into a pot portion of the machine by 57 cc, and the rubber material is injected into the mold at 5 cc per 1 second.

After injecting the material, a pressure of 900 kg/cm$^2$ is applied for one second, then after one second, the mold is opened to remove the spherical intermediate products.

Conditions of Manufacturing the Comparison Example

⑥ The mold for preliminary molding is explained with reference to FIGS. 11A to 12D.

⑦ Rubber materials for forming the outer layers each of which weighs 3.4 g are placed into the concave portions 32 of the pair of mold halves 30 of the lower mold 31. The materials are present by the upper mold 35 for 10 seconds to form unvulcanized rubber layers 36. After that, vulcanized inner cores 37 are introduced into the unvulcanized rubber shells 36 on either one of the mold halves 30. Then the other mold half 30 is folded and the rubber layers are pressed for 10 seconds, and then the intermediate products are taken out.

It took 11.4 seconds to produce the intermediate products as the present invention, and 20 seconds to produce the products of the comparison examples. When the intermediate products were removed, the unvulcanized rubber layers or the outer layers of the examples of the present invention adhere to and completely cover the cores, whereas separation of some of the outer layers is found in the comparison examples. The eccentricity of each inner core of the present invention examples was 0.1 mm, whereas the eccentricity was 0.3 mm in the comparison examples. In the process of producing comparison examples, when the pressing time is arranged to be less than 10 seconds, separation of the outer layers happens more frequently. The separation could not be prevented by increasing the pressure applied.

As described above, according to the present invention, golf ball cores are produced such that the eccentricity of each core is smaller the comparison examples, and the separation of outer layers and inner cores does not occur. That is to say, golf ball cores of high quality can be effectively produced with the present invention.

Figure 8A:
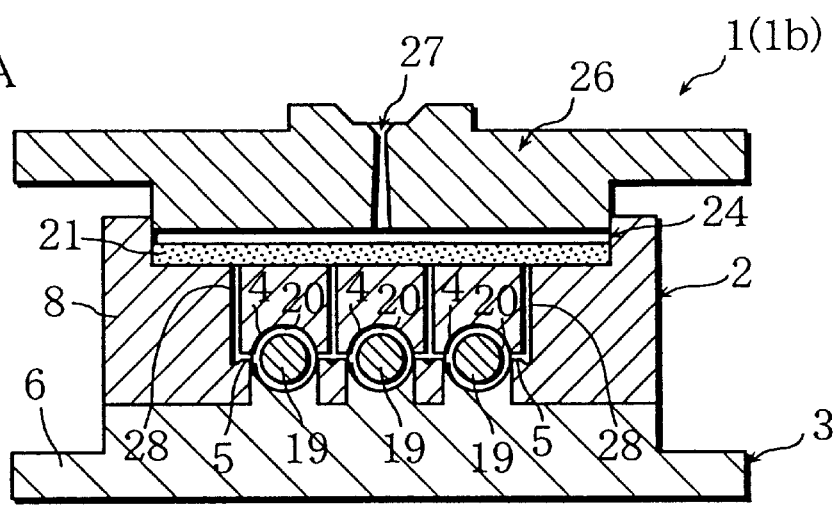
FIG. 8A is a schematic view explaining a manufacturing method for a golf ball using a mold for transfer molding.
Figure 8B:
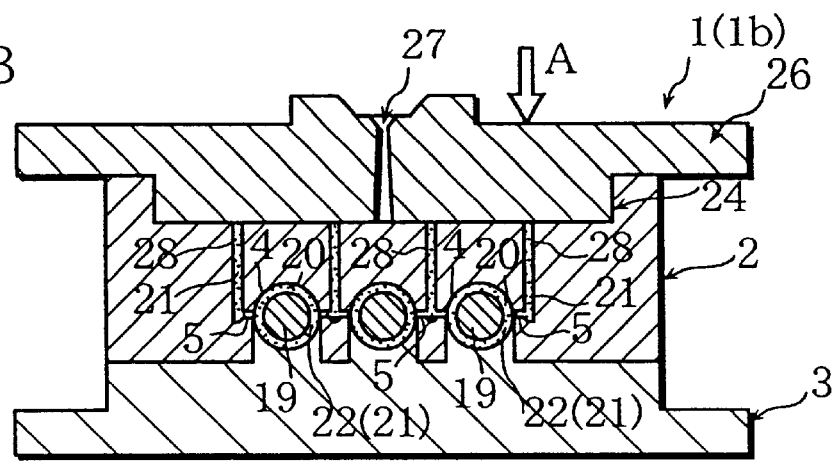
FIG. 8B is a schematic view providing an additional explanation of the manufacturing method.
Figure 8C:
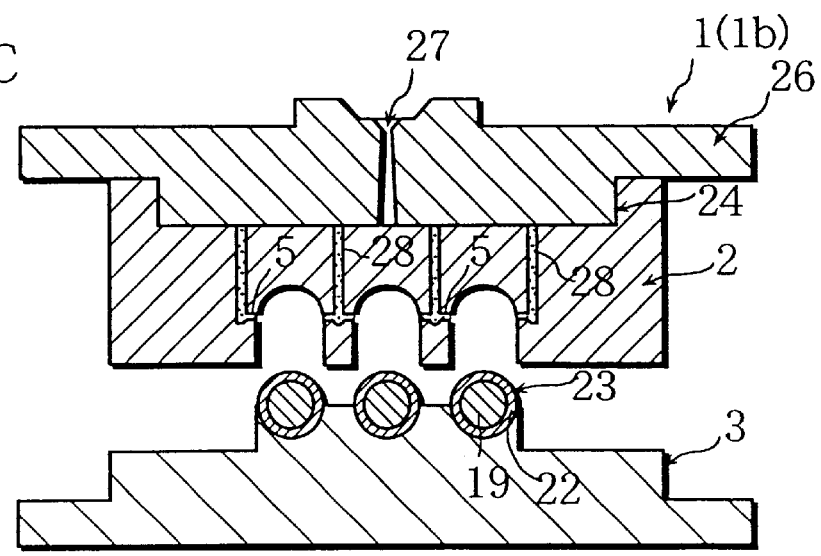
FIG. 8C is a schematic view for explanation of the manufacturing method.

FIG. 8A to FIG. 8C are schematic views to explain manufacturing processes of golf balls using a mold 1(1b) for transfer molding. The mold 1b is provided with a pressing portion 26, an upper mold side 2 and a lower portion 3. A predetermined amount of unvulcanized rubber material 21 is put into a pot portion 24 located at the upper portion of the upper mold side 2 through an inlet 27 of the pressing portion 26, as shown in FIG. 8A. The materials may be introduced by hand or by machine. A heater may be provided in the pot portion 24 to plasticize the material.

Figure 9:
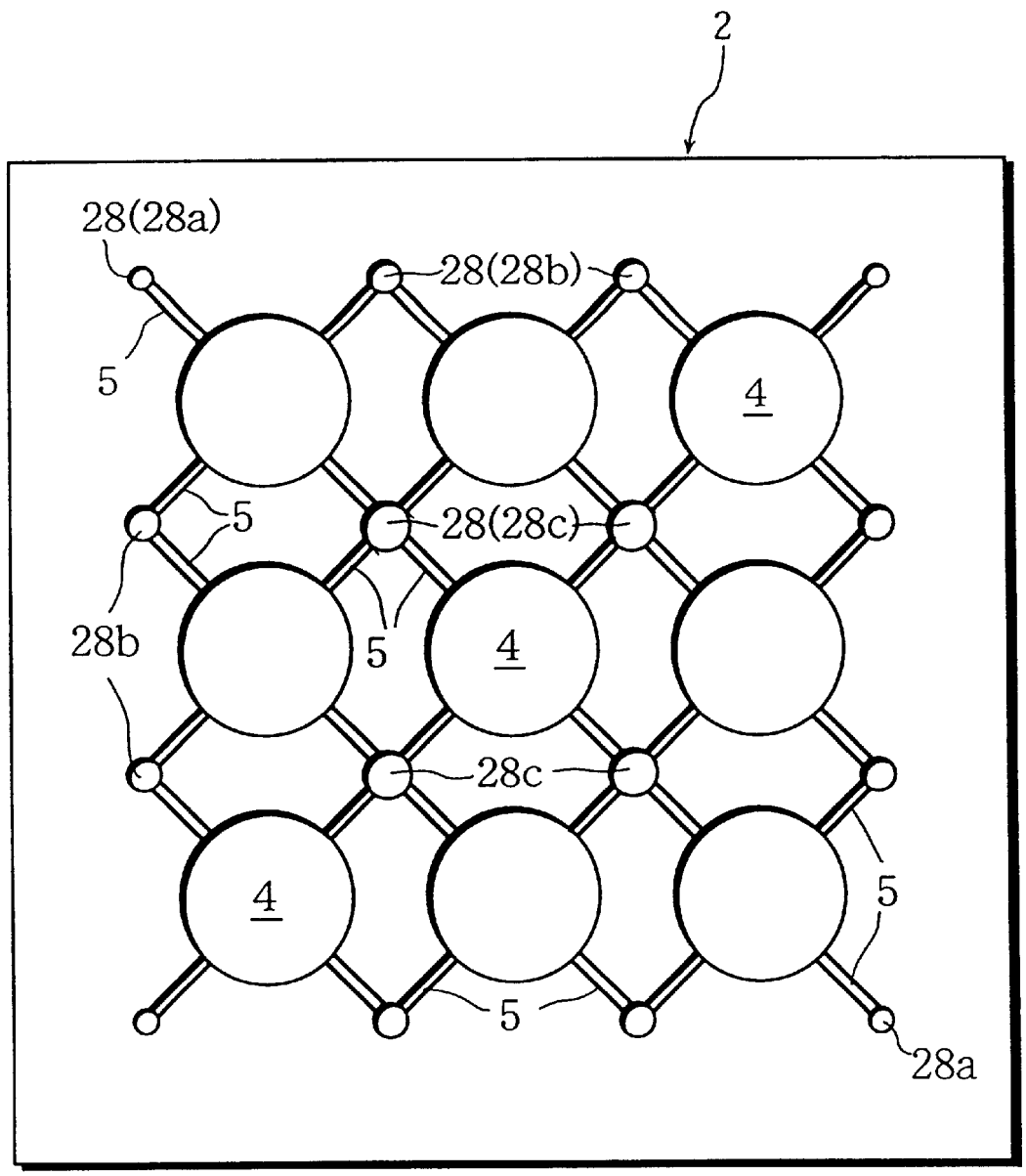
FIG. 9 is an explanatory view showing positions of passages and runner portions relative to cavities.

The mold 1b for transfer molding has a plurality of cavities 4 formed by the upper mold 2 and the lower mold 3. In this embodiment, nine cavities are provided as shown in FIG. 9. In each cavity 4, a vulcanized inner core 19 is held so as to define a spherical shell space 20 formed between the inner core 19 and an inner face of each cavity 4.

Referring to FIG. 8B, as the pressing portion 26 is lowered in the direction of arrow A, the unvulcanized rubber material 21 in the pot portion 24 is pressed into the space 20 through passages 28 vertically provided in the upper mold side 2 and runner portions 5 arranged horizontally in the mold side 2. Intermediate products 23 are thus manufactured, each comprising the inner core 19 which is layered with an unvulcanized rubber layer 22.

As shown in FIG. 8C, the upper mold side 2 is opened and the products 23 are removed from the mold 1b for transfer molding, and the products are put into a vulcanization mold, not shown, and the unvulcanized rubber layers 22 of the products are vulcanized to form two-layer cores. With the mold 1b for transfer molding, rubber materials 21 are not wasted, and a very thin layer can be formed. Furthermore, eccentricity of each core 19 is greatly reduced and golf balls with accurate dimensions can be produced.

Next, FIG. 9 is a plan view to explain the positions of the passages 28 and the runner portions 5 relative to the cavities 4. The passages 28 (sixteen passages are shown in this embodiment) shaped like cylinders are communicated with the pot portions 24 located at the upper portion of the upper mold side 2. The passages 28 are vertically provided in the upper mold side 2, and the lower end portions of the passages 28 communicated with the runner portions 5.

The runner portions 5 are extended to each cavity 4 (nine cavities are shown in this embodiment) from four directions in a grid manner as shown in the FIG. 9, and arranged to communicate with the cavity 4. Crossing portions and ends of the runner portions 5 communicate with the lower end portions of the passages 28.

Among the passages 28, there are passages 28a each of which communicate with an end portion of each of the runner portions 5. There are other passages 28b which communicating with end portions of two of the runner portions 5, and there are further passages 28c which communicating with a crossing portion of two of the runner portions 5.

The sectional area of each passage 28b is two times the sectional area of each passage 28a, and the sectional area of each passage 28c is four times the sectional area of each passage 28a. Therefore the unvulcanized rubber material 21 equally and quickly fills the cavities 4.

The configuration of the mold 1b for transfer molding in its closed state is the same as the mold 1a for injection molding, as described with reference to FIG. 3, and the configuration of the mold 1b in its opened state is the same as the mold 1a described with reference to FIG. 4.

That is to say, in the mold 1b for transfer molding, the upper mold 2 is provided with a rectangular upper mold main body 8, and a plurality of recessed portions 9 formed on the under face of the main body 8. At the back of the recessed portions 9, hemispherical concave portions 4a are provided to form upper half portions of the cavities 4. The lower mold 3 is provided with a rectangular lower mold main body 6, and protruding portions 7 corresponding to the recessed portions 9 of the upper mold 2. On the upper face of each protruding portion 7, hemispherical concave portions 4b are formed to form the lower half cavities 4.

A step portion 18 is provided between each recessed portion 9 of the upper mold 2 and each concave portion 4a is provided at the back of each recessed portion 9. When the mold is closed, the upper end face of each protruding portion 7 of the lower mold 3 contacts each step portion 18. Gate portions 17 of each cavity 4 are formed by grooves, each groove being a semicircle in cross section, formed on the upper end face of each protruding portion 7 of the lower mold 3. Other grooves, which are semicircular in cross section, are formed on each step portion 18. The end portion of each runner 5 communicating with each gate portion 17 is partially opened toward each recessed portion 9. However, when the mold 1 is closed, each end portion of each runner portion 5 is closed by each protruding portion 7 of the lower mold 3. Only each of the gate portions 17 is opened to each cavity 4.

Ejectors are provided on the lower mold side 3. Portions 10 for moving back and forth are provided in positions corresponding to the protruding portions 7 of the lower mold 3. That is to say, through holes are provided, which extend from the protruding portions 7 to the main body 6. The portions 10 for moving back and forth are inserted in the through holes to freely move vertically back and forth. When each of the portions 10 is in its back position, the upper end portion 11 of each portion 10 and the upper end portion 12 of each protruding portion 7 form a consecutive surface which is concavely curved.

A plurality of holding pins 13 for protruding into the cavities 4 are provided in the upper mold 2 and the lower mold 3 to freely move back and forth. Vertical hole portions for the insertion of the pins 13 of the upper mold 2 side are provided at positions on the concave portions 4a of the upper mold main body 8 of the upper mold 2. Vertical hole portions for the insertion of and for holding the pins 13 of the lower mold 3 side are provided in each portion 10 of each ejector. The vertical hole portions hold the inserted holding pins 13 as they freely move back and forth. In an upper view and a bottom view of pins 13 of each cavity 4, the pins 13 are positioned so as that the central angle which each pin 13 is forms with each adjacent pin 13 equal to one another. The positions of the pins 13 of the upper mold 2 and the positions of the pins 13 of the lower mold 3 correspond to each other. The number of the pins 13 on each concave portion on each mold side are for example, three or four. The holding pins 13 of the upper mold side 2 and the lower mold side 3 are be moved back and forth by a driving mechanism, not shown.

Because the end faces of the holding pins 13 are concavely curved, when the holding pins 13 are in their backed position, the end faces of the holding pins 13 and each inner face of the cavity 4 form a continuous surface. To be specific, as shown in FIG. 6, the end faces of the holding pins 13 and the inner faces of each hemispherical concave portion 4a and hemispherical concave portion 4b form a continuous surface.

The pins 13 on the upper mold side 2 protrude into each cavity 4 by a protruding length $T_1$, and the pins 13 on the lower mold side 3 protrude into each cavity 4 by a protruding length $T_2$. The difference between the length $T_1$ and the length $T_2$ are arranged to be 0.03 mm to 0.2 mm. To be specific, the length $T_1$ of the pins 13 on the upper mold side 2 is arranged to be 1.8 mm, and the length $T_2$ of the pins 13 on the lower mold a side 3 is arranged to be 1.7 mm, therefore, the length $T_1$ is arranged to be slightly longer than the length $T_2$.

A method for manufacturing multiple piece golf balls using the mold 1b for transfer molding is described with reference to FIGS. 8A, 8B, 8C and FIGS. 3 to 6. In the method for manufacturing a core (two-layer core) of a golf ball, a vulcanized inner core 19 is held in each cavity 4 as to form a spherical shell space 20 between each inner core 19 and each cavity 4. In this case, the surface of each inner core 19 is also preferred to be buffed previously.

Then the unvulcanized rubber material 21 is transferred into each space 20 in each of the cavities 4. To be specific, the material 21 received in the pot portion 24 is pressed by the pressing portion 26 to fill each of the spaces 20 in each cavity 4 through the passages 28 and the runner portions 5. Thus an unvulcanized rubber layer 22 is layered one each inner core 19 to form each of the spherical intermediate products 23. Because the unvulcanized material 21 which is pressed is not vulcanized in this process, the material 21 does not solidify in the passages 28 and the runner portions 5. The holding pins 13 are moved back when the rubber material 21 fills each of the spherical shell spaces 20.

In the mold 1b for transfer molding, the holding pins 13 on the upper mold side 2 is also arranged to be longer the holding pins on the lower mold 3 side by a determined amount, specifically 0.03 mm to 0.2 mm, and the volume or the thickness of each unvulcanized rubber layer 22 on the upper mold side 2 is greater than the volume of each layer 22 on the lower mold side 3. Therefore, the resilience of each layer 22 on the upper mold 2 is greater than that of each layer 22 on the lower mold 3. The intermediate products 23 are detached from the upper mold and remain on the lower mold 3 side. If the difference between the protruding length $T_1$ and the length $T_2$ is below 0.03 mm, some of the products 23 may become attached to the upper mold side 2 when the mold 1a is opened, and thus the removal of the products take a substantial amount of time. Contrary to this, if the difference is more than 0.2 mm, the difference in the thickness between each layer 22 on the upper mold side 2 and the lower mold side 3 becomes too large and may cause an eccentricity in each of the inner cores 19.

Next, when the mold 1b is opened, the ejectors ascend in each portion 10 for ejecting each product 23, and the products 23 are removed from the mold. Then the products 23 are put into a mold for vulcanization, not shown, and the unvulcanized rubber layers 22 of the products 23 are vulcanized to form cores. That is to say, two-layer cores are formed, each having a vulcanized inner core 19 on which outer layers are vulcanized.

Figure 10:
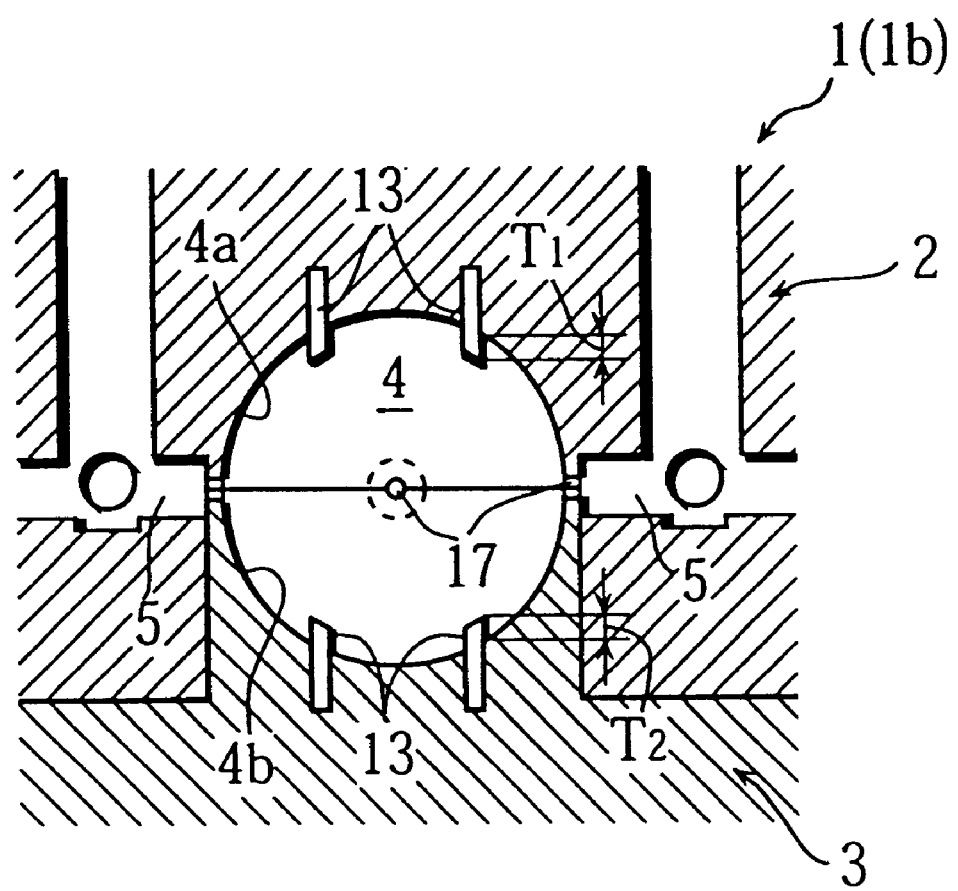
FIG. 10 is a schematic view showing another mold for transfer molding.
Figure 12A:
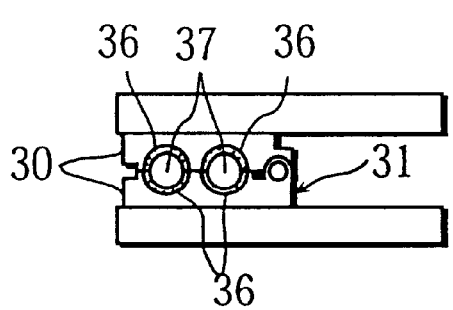
FIG. 12A is an explanation of the prior art manufacturing method.
Figure 12B:
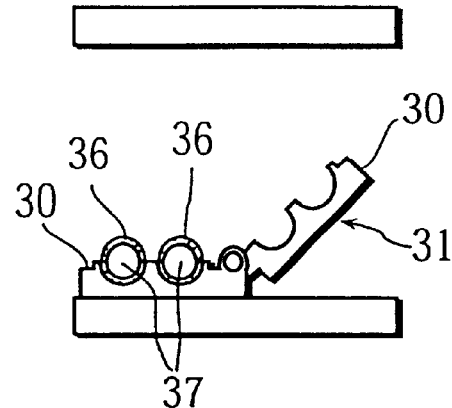
FIG. 12B is an explanation of the prior art manufacturing method.
Figure 12C:
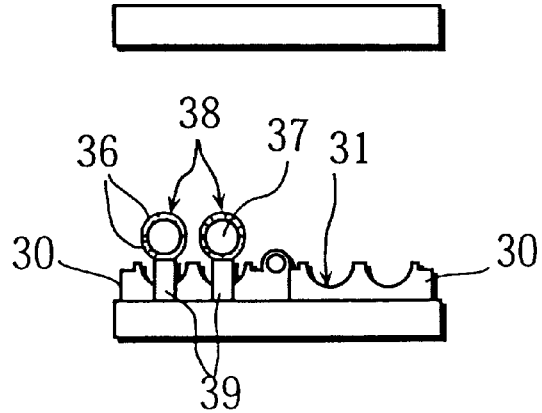
FIG. 12C is an explanation of the prior art manufacturing method.
Figure 12D:
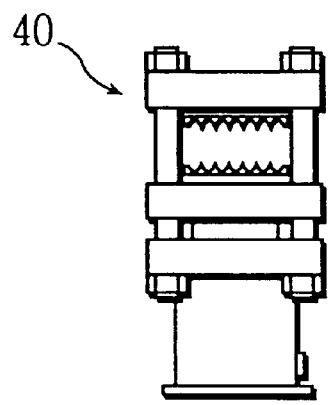
FIG. 12D is a explanation of the prior art manufacturing method.

FIG. 10 shows another mold 1(1b) for transfer molding. In this mold 1b, holding pins 13 are fixed in an upper mold 2 and a lower mold 3 for protruding into cavities 4. In this case, after transfer molding, unvulcanized rubber layers of the intermediate products are removed from the mold 1a are pitted by the holding pins 13. However the pits soon start to become shallower according to the shrinkage of the unvulcanized layers, and the pits are completely covered by flow of rubber. The amount of unvulcanized rubber material to be filled introduced is arranged so that the pits can be completely covered.

The mold 1b for transfer molding is not restricted to be the one shown above as an embodiment of the present invention. The holding pins 13 on the lower mold side 3 may be arranged to be longer the holding pins 13 on the upper mold side 2 so that the intermediate products are adhered to the upper mold side 2 when the mold 2 is opened. In such case, removing of the intermediate products are operated as such that the holding pins 13 on the upper mold side 2 are extended to push down the products and the products can be received by a receiving plate positioned between the upper mold 2 and the lower mold 3.

In the mold 1b for transfer molding, the runner portions 5 and the passages 28 are provided on the side of the upper molds 2. However the runner portions 5 and the passages 28 may be provided on the side of the lower mold 3. In other words, the runner portions 5 and the passages 28 may be provided in either of the upper mold 2 or the lower mold 3.

Cores of golf balls as intermediate products are manufactured according to the conditions described below. At the same time, as comparison examples, golf ball cores are manufactured according to the conventional method explained with reference to FIGS. 11 and 12.

Conditions of Manufacturing Example

① A compound of an inner core and a compound of a rubber material for forming an outer layer are each arranged to have a weight ratio of each substance as shown below.

| BR01 | 100 | (Polybutadiene, of which 97% is cis, made by Japan Synthetic Rubber Co. Ltd.) |
|---|---|---|
| acrylic zinc | 25 | |
| zinc oxide | 20 | |
| dicumylperoxide | 1 | |

② The substances shown in ① are mixed, and vulcanizing by pressed at 152° C. for 20 minutes to form inner cores, each having a diameter of 34 mm.

③ A rubber material for forming the outer layer is produced by mixing the substances shown in ①.

④ The mold shown in FIG. 10 is used as the mold for transfer molding. The inner diameter of each cavity is arranged to be 37 mm.

⑤ The rubber material for forming outer layer is placed in the pot portion of the mold for injection molding by using an injection molding machine, while measuring the amount of the material being injected. The rubber material is introduced into the cavities by the pressing portion at a velocity of 20 mm/s.

When the press is completed, after one second, the mold is opened to remove the intermediate products. The products are then placed in a mold for vulcanization and vulcanized.

Conditions of Manufacturing Comparison Example

⑥ The mold for preliminary molding explained with reference to FIGS. 11A to 12D is used.

⑦ Rubber materials for forming an outer layer each weighing 3.4 g are placed into the concave portions 32 of the pair of mold halves 30 of the lower mold 31. The materials are pressed by the upper mold 35 for 10 seconds to form unvulcanized rubber layers 36. After that, vulcanized inner cores 37 introduced into the unvulcanized rubber shells 36 in either of the mold halves 30. Then the other mold half 30 is folded the rubber layers are pressed for 10 seconds, and the intermediate products are removed.

As a result, it took 11.4 seconds to produce the intermediate products of the present invention, and 20 seconds to produce the products of the comparison examples. When the intermediate products were removed, the unvulcanized rubber layers or the outer layers of the examples of the present invention completely adhere to and cover the cores, whereas separation of some of the outer layers is found in the comparison examples. The eccentricity of each inner core of the present invention was 0.1 mm, and 0.3 mm in the comparison examples. In the process of producing comparison examples, if the pressing time is arranged to be less than 10 seconds, separation of the outer layers happens more frequently. The separation could not be prevented by increasing the amount of pressure applied.

As described above, with the present invention, such golf balls cores are produced when the eccentricity of each core is smaller than that of the comparison examples, and separation of outer layers and inner cores does not occur. That is to say, golf ball cores of high quality can be effectively produced according to the present invention.

According to the present invention, the effects described below are obtained.

According to the manufacturing method of the present invention, each of the spherical intermediate products 23 of the invention has no good seam, unlike the products manufactured according to the conventional method. Therefore each of the unvulcanized rubber layer 22 will not separate from the core. The eccentricity of each inner core 19 of each product is reduced, because the unvulcanized material 21 is filled while holding each inner core 19 in each cavity 4 define the spherical shell space 20 between each inner core 19 and each cavity 4. Therefore golf balls of high quality are manufactured.

According to the manufacturing method of the present invention, a large number of golf balls can be formed at one time, and the productivity of the golf balls is increased. When injection molding golf balls, each inner core 19 is surely held in the center of each cavity 4, forming a spherical shell space 20 between each inner core and each cavity.

According to the method of the present invention, after injection molding, when the mold 1 is opened, the intermediate products 23 are arranged to remain in the lower mold side 3 or the upper mold side 2. It can be arranged that all the formed products 23 all together remain in either side of the molds. Thus the process of removing the products can be operated effectively, and the productivity of the products is increased.

According to the method of the present invention, adhesion between each unvulcanized rubber layer 22 and each inner core 19 is increased. Because the cores 19 are previously polished, the product 23 is not out of shape or eccentric.

According to the method of the present invention, because the runner portions are provided in the upper mold or the lower mold, the unvulcanized rubber material 21 will not be pressed out from the runner portions 5 when the mold 1 is opened. Therefore, the closing operation of the mold will not interfere with the flow of rubber 21.

According to the apparatus of the present invention, a number of golf balls can be formed at one time, and the productivity of the golf balls is greatly improved.

While preferred embodiments of the present invention have been described in this specification, it is to be understood that the invention is illustrative and not restrictive, because various changes are possible within the spirit and scope of the invention.

What is claimed is:

1. A method for manufacturing a two-piece core for a golf ball comprising:

providing a mold for preliminary forming which defines a mold cavity, the mold having an upper mold and a lower mold, each of which is provided with a plurality of retractable or fixed holding pins protruding into the mold cavity;

positioning a vulcanized inner core in the mold cavity by the protruded holding pins so as to define a shell space between the inner core and an inner surface of the mold cavity, each of the holding pins of the upper mold protruding into the cavity and each of the holding pins of the lower mold protruding into the cavity having a difference in protruding length ranging from 0.03 to 0.2 mm;

introducing an unvulcanized rubber material into the shell space so that a layer of unvulcanized rubber covers the inner core, forming an intermediate product;

removing the intermediate product from the mold;

placing the intermediate product into a vulcanization mold; and vulcanizing the layer of unvulcanized rubber.

2. The method for manufacturing a golf ball as set forth in claim 1, wherein the surface of the inner core is polished prior to being positioned within the mold cavity.

3. The method for manufacturing a golf ball as set forth in claim 1, wherein a runner portion communicating with a gate portion is provided in the interior of the upper mold.

4. The method for manufacturing a golf ball as set forth in claim 1, wherein a runner portion communicating with a gate portion is provided in the interior of the lower mold.

5. A method for manufacturing a two-piece core for a golf ball comprising:

providing a mold for preliminary forming which defines a mold cavity, the mold having an upper mold and a lower mold, each of which is provided with a plurality of retractable or fixed holding pins protruding into the mold cavity;

positioning a vulcanized inner core in the mold cavity by the protruded holding pins so as to define a shell space between the inner core and an inner surface of the mold cavity, each of the holding pins of the upper mold being arranged to protrude longer into the cavity than each of the holding pins of the lower mold;

introducing an unvulcanized rubber material into the shell space so that a layer of unvulcanized rubber covers the inner core, forming an intermediate product;

removing the intermediate product from the mold;

placing the intermediate product into a vulcanization mold; and vulcanizing the layer of unvulcanized rubber.

6. A method for manufacturing a two-piece core for a golf ball comprising:

providing a mold for preliminary forming which defines a mold cavity, said mold cavity communicating with a chamber containing a predetermined amount of unvulcanized rubber material, the mold having an upper mold and a lower mold, each of which is provided with a plurality of retractable or fixed holding pins protruding into the mold cavity;

positioning a vulcanized inner core in the mold cavity by the protruded holding pins so as to define a shell space between the inner core and an inner surface of the mold cavity, each of the holding pins of the upper mold protruding into the cavity and each of the holding pins of the lower mold protruding into the cavity having a difference in protruding length ranging from 0.03 to 0.2 mm;

applying pressure to the unvulcanized rubber material in the chamber to introduce the unvulcanized rubber material into the shell space so that a layer of unvulcanized rubber covers the inner core, forming an intermediate product;

removing the intermediate product from the mold;

placing the intermediate product into a vulcanization mold; and vulcanizing the layer of unvulcanized rubber material.

7. The method for manufacturing a golf ball as set forth in claim 6, wherein the surface of the inner core is polished prior to being positioned within the mold cavity.

8. The method for manufacturing a golf ball as set forth in claim 6, wherein a runner portion communicating with a gate portion is provided in the interior of the upper mold.

9. The method for manufacturing a golf ball as set forth in claim 6, wherein a runner portion communicating with a gate portion is provided in the interior of the lower mold.

10. A method for manufacturing a two-piece core for a golf ball comprising:

providing a mold for preliminary forming which defines a mold cavity, said mold cavity communicating with a chamber containing a predetermined amount of unvulcanized rubber material, the mold having an upper mold and a lower mold, each of which is provided with a plurality of retractable or fixed holding pins protruding into the mold cavity;

positioning a vulcanized inner core in the mold cavity by the protruded holding pins so as to define a shell space between the inner core and an inner surface of the mold cavity, each of the holding pins of the upper mold being arranged to protrude longer into the cavity than each of the holding pins of the lower mold;

applying pressure to the unvulcanized rubber material in the chamber to introduce the unvulcanized rubber material into the shell space so that a layer of unvulcanized rubber covers the inner core, forming an intermediate product;

removing the intermediate product from the mold;

placing the intermediate product into a vulcanization mold; and vulcanizing the layer of the unvulcanized rubber material.

* * * * *